United States Patent [19]
Corbani

[11] 3,748,636
[45] July 24, 1973

[54] DISPLAY SYSTEM

[75] Inventor: John F. Corbani, Santa Barbara, Calif.

[73] Assignee: Sloan Technology Corporation, Santa Barbara, Calif.

[22] Filed: July 7, 1970

[21] Appl. No.: 52,915

[52] U.S. Cl. .................................. 340/3 R, 340/3 C
[51] Int. Cl. ............................................. G01s 9/68
[58] Field of Search ....................... 340/3 R, 3 C, 1, 340/16 P; 343/13, 11; 315/22

[56] References Cited
UNITED STATES PATENTS
2,993,203  7/1961  Hulst ..................................... 340/16
3,411,030  11/1968  Henderson et al. .................... 315/22

*Primary Examiner*—Richard A. Farley
*Attorney*—Angus & Mon

[57] ABSTRACT

A display system according to the present disclosure includes a transmitter for transmitting a pulse into a region and at least two receivers for receiving pulses reflected from objects in the region. A sawtooth wave generator generates a continuously increasing linear sawtooth waveform which is impressed on the one set of deflection plates, such as the vertical plates, of a cathode ray tube. Upon receipt by a first receiver of a reflected pulse from an object in the region, the sawtooth generator is disconnected from the first set of deflection plates and the bias on the first set of deflection plates is decreased in a cosine function. At the same time, the bias on the other set of deflection plates such as the horizontal plates, is increased in a sine wave function. When a second receiver receives a reflected pulse from the object in the region, the gun of the cathode ray tube is operated to increase the intensity of the display to show a blip indicative of the relative location of the object. Also, the sawtooth waveform is reimpressed onto the first set of deflection plates when the second receiver receives a pulse.

10 Claims, 4 Drawing Figures

INVENTOR.
JOHN F. CORBANI
BY
ATTORNEYS.

DISPLAY SYSTEM

This invention relates to display techniques for displaying the relative position of objects and a cathode ray tube, and particularly to inexpensive sonar display apparatus.

Although the present invention will be described in connection with a sonar system, it is to be understood that the present invention is equally useful for above-water systems such as radar systems.

Heretofore, sonar equipment has been limited to military and major commercial uses. One reason sonar equipment has been used only in military and major commercial equipment has been that such equipment has been prohibitively expensive for most small commercial and sport purposes. The present invention is particularly concerned with improved sonar equipment which is relatively inexpensive as compared to prior sonar apparatus.

Accordingly, it is an object of the present invention to provide improved sonar equipment and the like which is relatively inexpensive compared to prior equipment having similar functional objects.

Another object of the present invention is to provide inexpensive display techniques for sonar display and the like which can be used for sporting purposes and on small commercial scale.

Another object of the present invention is to provide sonar equipment and the like which is compact and whose antenna arrangement may be directed by hand.

In accordance with the present invention, a display is affectuated by transmitting a signal into a region and by receiving, by least two receivers, signals reflected from objects in the region. In accordance with the display technique, a first set of deflection plates of a cathode ray tube are biased by a continuous linearly increasing sawtooth signal commencing at a time coincident with the generation of a transmitted pulse and continuing until reception of a reflected pulse by one of the receivers. When the reflected pulse is received by the first receiver, the signal biasing the first set of deflection plates recedes in a cosine function. As the biasing signal on the first set of plates decreases in a cosine signal, a second set of deflection plates is biased by an increasing sine wave signal. Upon reception of a reflected pulse by the second receiver, the intensity control on the cathode ray tube is initiated to indicate a blip on the cathode ray tube screen. The location of the blip on the tube is indicative of the relative position of the object from the antenna array.

In accordance with one feature of the present invention, the transmitter and receiver array are mounted to a handle so that they may be directed manually.

The above and other features of this invention will be more fully understood from the following detailed description and the accompanying drawing, in which.

FIGS. 4A – 4G, taken together, illustrate various waveforms and patterns for explaining the operation of the apparatus.

Figure 1:
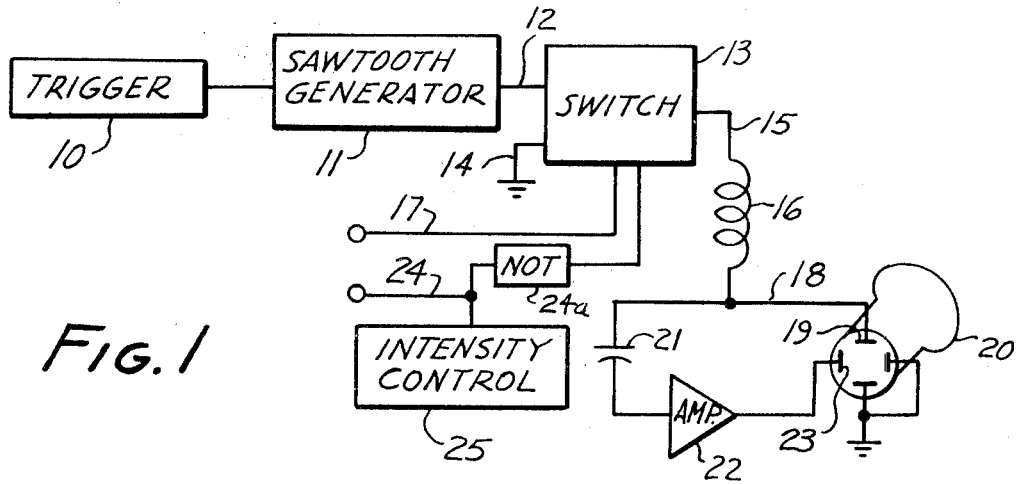
FIG. 1 is a block diagram of a circuit for a display system in accordance with the presently preferred embodiment of the present invention.

FIG. 1 illustrates a block diagram of a circuit in accordance with the presently preferred embodiment of the present invention. The circuit comprises a trigger 10 adapted to drive sawtooth generator 11 which generates a sawtooth waveform on lead 12. Switch 13 has one input connected to lead 12 and a second input connected to lead 14 which in turn is connected to electrical ground. Switch 13 provides an output via lead 15 to inductor coil 16. As will be more fully understood, switch 13 is biased to pass signals appearing at one input or the other in accordance with signals appearing on leads 17 and 24.

Inductor coil 16 is connected via lead 18 to the vertical deflection plates 19 of cathode ray tube 20 and to one side of capacitor 21 which in turn is connected to amplifier 22. Amplifier 22 is connected to the horizontal deflection plates 23 of cathode ray tube 20. Lead 24 is connected to intensity control 25 which controls the gun (not shown) of cathode ray tube 20. Lead 24 is also connected through NOT gate 24a to switch 13.

Figure 2:
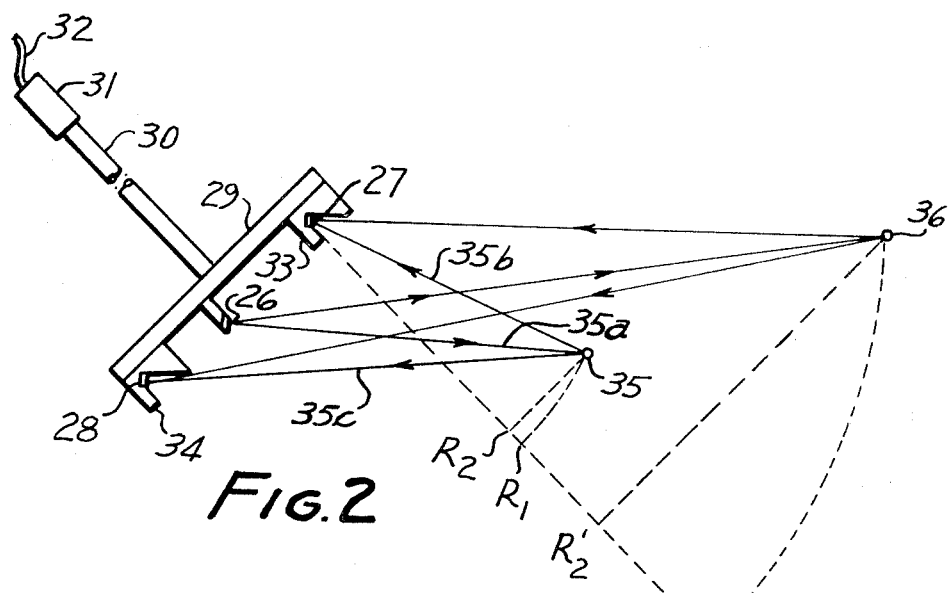
FIG. 2 is a view of a manually directable antenna array for use with the circuit illustrated in FIG. 1, FIG. 2 also illustrating the manner by which the apparatus may be used.

As illustrated in FIG. 2, transmitter 26 and receivers 27 and 28 are mounted on housing 29 for use in detecting objects underwater. Preferably housing 29 is mounted on a suitable extended handle 30 carrying a grip portion 31 so that the same may be manipulated easily underwater by an operator and pointed along line 30a, parallel to handle 30. Preferably, handle 30 carries cable 32 which provides the necessary electrical connections to transmitter 26 as well as leads 17 and 24. Lead 17 is connected to the output of receiver 27 and lead 24 is connected to the output of receiver 28. Also as illustrated in FIG. 2, shields 33 and 34 are so disposed and arranged with receivers 27 and 28 on housing 29 so as to confine the receivers to receive signals from a selected field of view. As illustrated in FIG. 2 the receivers are arranged with transmitter 26 so that receiver 27 will ordinarily receive a signal reflected from an object within the field of view of the receivers before a pulse signal is received by receiver 28.

To explain the operation of the apparatus in accordance with the present invention, it is assumed that objects 35 and 36 are disposed in the region of the field of view of transmitter 26 and receivers 27 and 28 and on one side of reference line 30a. Trigger 10 provides a periodic pulses 37 (FIG. 4A) which trigger sawtooth generator 11 to produce sawtooth waveform 38 (FIG. 4B) on lead 12. At the same time that pulse 37 is generated by trigger 10, a pulse is transmitted by transmitter 26 into the region toward objects 35 and 36.

At some time, and before the next pulse produced by trigger 10, the pulse generated by transmitter 26 is reflected from object 35 and the reflected pulse is first received by receiver 27. During the time that the signal traveled from transmitter 26 to object 35 via path 35a and back to receiver 27, via path 35b, the sawtooth generator was connected directly through switch 13, coil 16 to the vertical deflection plates 19 of cathode ray tube 20. Thus, the bias on the vertical deflection plates increased continuously to a point corresponding to $R_1$ on both the cathode display (FIG. 3) and waveform 39 illustrated in FIG. 4C. The physical relationship is shown with respect to point $R_1$, along line 30a in FIG. 2. It can be understood from the cathode ray screen display shown in FIG. 3, that the vertical deflection plates have been biased too far for a proper indication of the location of the object 35 in the vertical direction. However, if one were to move in a perfect circle from point $R_1$ on the vertical scale of the display illustrated in FIG. 3 using zero coordinates 40 as the center of such circle, one would pass through the point 44 desired for display of the location of object 35. The circular movement to the display point 44 from position $R_1$ is the function of the circuitry illustrated in FIG. 1 and is accomplished by decreasing the bias on the vertical plates in a cosine function and simultaneously increasing the bias on the horizontal plates in a sine function, and this combination of sine and cosine function is sometimes called a "circular function."

Upon receipt of the reflected pulse by receiver 27, switch 13 is biased by a signal appearing on lead 17 (which may for example, be connected directly to receiver 27) so that switch 13 connects lead 14 to lead 15 and disconnects sawtooth generator 11 from the vertical deflection plates. During the time that the sawtooth generator was connected to the vertical deflection plates, capacitor 21 was charged to a level equal to that of the sawtooth waveform just before it was disconnected. When switch 13 connects lead 14 to lead 15, capacitor 21 discharges through inductor 16 to ground 14. The discharge occurs in accordance with the LC time constant of the capacitor 21 and inductor 16. The discharge of capacitor 21 through inductor 16 provides a cosine waveform on lead 18 to vertical plates 19 causing the vertical plates to follow the cosine function illustrated as portion 39 of the waveform illustrated in FIG. 4C. At the same time, capacitor 21 provides a 90° phase shift to the horizontal deflection plates so that a sine wave signal is delivered to the horizontal deflection plates 23 of cathode ray tube 20. Amplifier 22 holds its input at near ground potential so that a cosine function voltage is generated at the vertical plates and sine wave current at the input to amplifier 22. Amplifier 22 corrects the current to a voltage. The sine wave voltage is illustrated as waveform 41 in FIG. 4D. The cosine and sine function signals, exemplified by waveforms 39 and 41 (FIGS. 4C and 4D, respectively), are "monotonic" in nature, i.e., continuous in the sense of being a non-stepped, smooth and unbroken curve. Only the decreasing-value portion of a cosine waveform is used, and only the increasing-value portion of a sine waveform is used.

When a pulse is received by receiver 28, via path 35c, a signal is impressed on lead 24 to operate intensity control 25 to increase the intensity of the gun of cathode ray tube 20 as illustrated by waveform 43 so that a blip 44 appears on the cathode ray display. At the same time, NOT gate 24a is operated on by the pulse so that upon completion of the pulse, a signal is sent from the NOT gate to operate switch 13 to leads 12 and 15 and to open the connection between leads 14 and 15.

Figure 3:
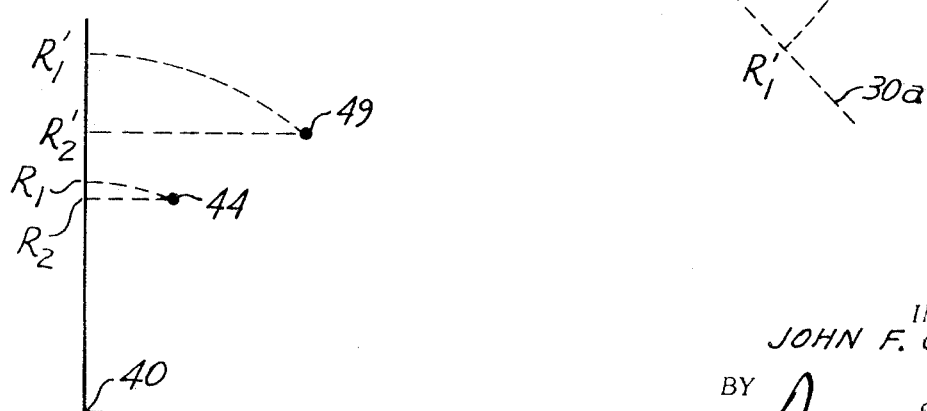
FIG. 3 is an illustration of a display on a cathode ray tube screen.
Figure 4:
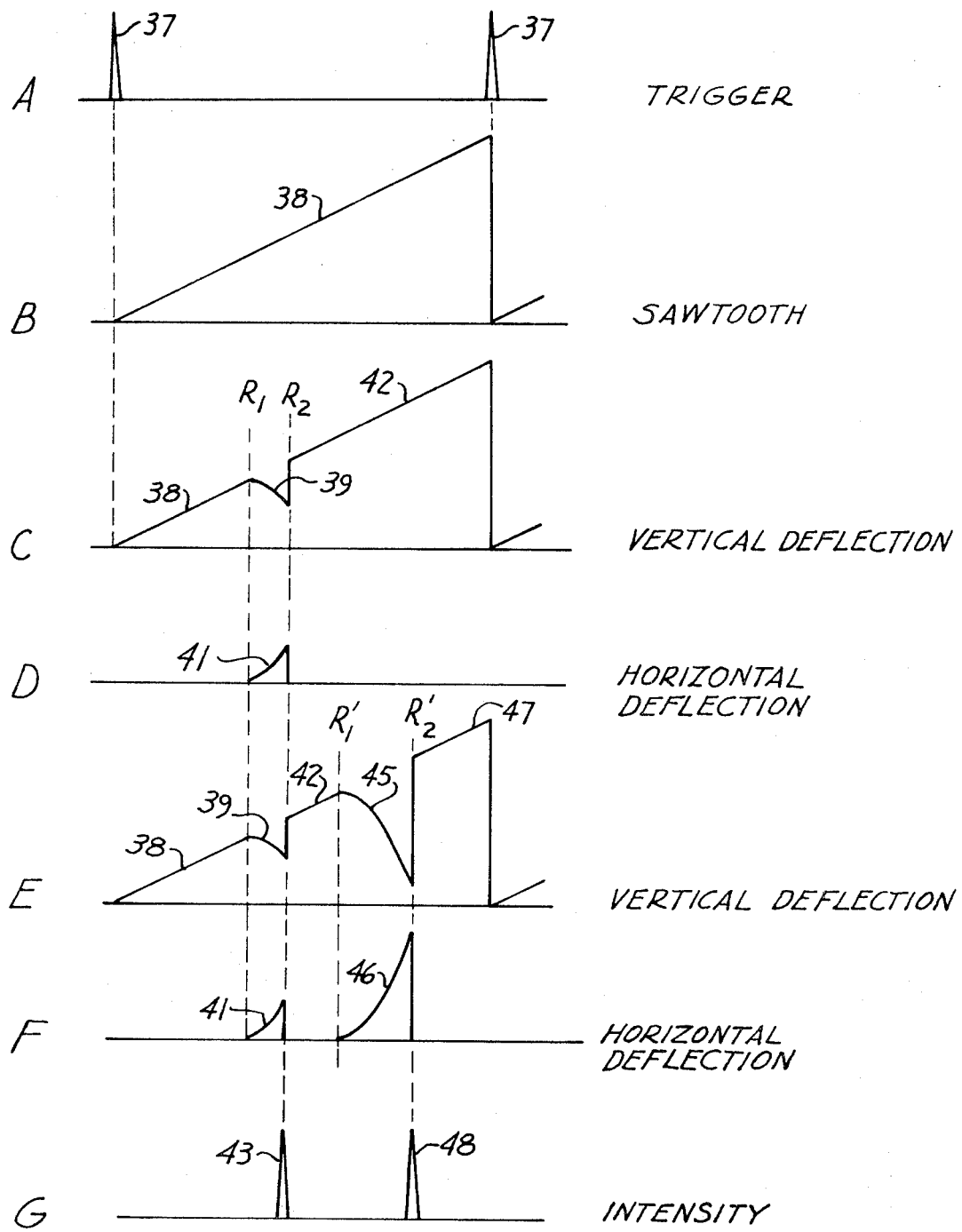

Hence, the time elapsed between the instant that the reflected signal is received by receiver 27 and the instant it is received by receiver 28 (the time difference being representative of the difference of the distances of path 35b and 35c), the bias on the vertical deflection plates is permitted to reduce in a cosine function and the bias on the horizontal deflection plates is permitted to increase in a sine wave function thereby causing the entire display to move in the path of the circle having its center at the zero coordinate 40 on the display illustrated in FIG. 3. When the reflected signal is received by receiver 28, a signal is imposed via lead 24 (which may be connected directly to receiver 28) to operate the intensity control and thereafter to operate switch 13 to reconnect sawtooth generator 11 to re-establish the sawtooth waveform on the vertical deflection plates 19. This is illustrated at waveform 42 in FIGS. 4C and 4E. Also, capacitor 21 is charged so that the horizontal plates are biased back to zero.

One feature of the present invention resides in the fact that the circuit is entirely self-compensating and the gain on the plates of cathode ray tube 20 may be adjusted by adjusting the intensity and slope of the sawtooth waveform 38 generated by generator 11. Hence, the relative amplitudes of the sine and cosine signals are determined by the intensity of the sawtooth signal at the instant of operation of trigger 10.

In the event that a second object 36 is in the field of view of the apparatus, receiver 27 receives a reflected signal from object 26 at $R_1'$ to again disconnect switch 13 from connection to sawtooth generator 11, so that capacitor 21 again discharges through inductor 16 to ground 14 to again provide a cosine waveform on the vertical plates 19 of cathode ray tube 20 and a sine waveform on the horizontal plates 23 of the cathode ray tube. The cosine function is illustrated generally at 45 in FIG. 4E and the sine waveform is illustrated generally at 46 in FIG. 4F. The sine waveform and cosine waveform continue until receipt of the reflected signal by receiver 28 at $R_2'$ at which time the sawtooth wave continues as illustrated at 47 and intensity control 25 is operated by pulse 48 to again display a blip, as illustrated at 49 on the display in FIG. 3.

The present invention thus provides apparatus for providing sonar display for use in underwater sonar detection equipment. The display is effective to display relative positions of objects within the field of view of the antenna array. It is to be understood that although the present invention is described in connection with sonar display, it is equally useful in above-water systems, for example, in radar display systems. The apparatus is relatively inexpensive as compared to prior apparatus for similar use, and may be used for commercial and sporting purposes.

This invention is not to be limited by the embodiment shown in the drawings and described in the description, which is given by way of example and not of limitation, but only in accordance with the scope of the appended claims.

What is claimed is:

1. A method for displaying the relative position of object in a region wherein a pulse signal is transmitted into the region and reflected pulse signals are received from said region by at least two receivers, said method comprising the steps of continuously increasing in a linear function the bias on one set of deflection plates of a cathode ray tube until reception of a pulse signal from said region by a first receiver, subsequently biasing said one set of deflector plates and an opposite set of deflection plates in a circular function commencing with reception of a pulse signal by a second receiver, and increasing the bias to the gun of the cathode ray tube upon reception of the pulse signal by said second receiver.

2. A method according to claim 1 wherein the continuously increasing linear function bias commences upon transmission of a pulse by the transmitter and wherein the circular function has a center of radius coincident with the point of commencement of the linear function.

3. A method according to claim 1 wherein said circular function is achieved by biasing said one set of deflection plates with a monotonically decreasing-value portion of a cosine function signal and biasing said opposite set of plates with a monotonically increasing-value portion of a sine function signal.

4. A method according to claim 3 wherein the continuously increasing linear function bias commences upon transmission of a pulse by the transmitter and wherein the circular function has a center of radius coincident with the point of commencement of the linear function.

5. Apparatus for indicating the relative positions of objects in a region comprising: transmitter means for transmitting pulses into said region; first and second receiver means each for receiving pulses reflected from objects in said region; a cathode ray tube having a screen for displaying images; vertical and horizontal deflection plates on said cathode ray tube for relatively moving said images; intensity control means on said cathode ray tube for controlling the intensity of said images; and circuit means connected to said transmitter means and first and second receiver means, said circuit means including means for continuously increasing in a linear function the bias on one set of deflection plates, means responsive to said first receiver means for decreasing the bias on said one set of plates in a monotonically decreasing-value portion of a cosine function starting at the time when said first receiver means receives a pulse from said region, and means responsive to said first receiver means for increasing the bias on the other set of plates in a monotonically increasing-value portion of a sine function starting at the time when said first receiver means receives a pulse from said region.

6. Apparatus according to claim 5 wherein said circuit means further includes means responsive to said second receiver means for operating said intensity control means to increase the intensity of said image when said second receiver means receives a pulse from said region.

7. Apparatus according to claim 5 wherein said circuit means comprises a sawtooth generator for providing a signal of continuously increasing intensity in a linear function, trigger means for initiating said sawtooth generator when said transmitter means transmits a pulse into said region, switch means having a first input connected to said sawtooth generator and having a second input connected to a reference voltage, inductor means connected between the output from said switch means and said vertical deflection plates, a capacitor connected between said vertical deflection plates and said horizontal deflection plates and means connecting said switch means to said first and second receiver means so that when a pulse is received by said first receiver means from said region said switch means disconnects communication between its output and its first input and connects communication between the output and its second input, and when a pulse is received by said second receiver means from said region, said switch means disconnects communication between its second input and its output and connects communication between its first input and its output.

8. Apparatus according to claim 7 wherein said circuit means further includes means responsive to said second receiver means for operating said intensity control means to increase the intensity of said image when said second receiver means receives a pulse from said region.

9. Apparatus according to claim 7 further including a housing supporting said transmitter means and said first and second receiver means, and grip means for holding said housing whereby the housing may be moved manually to alter the extent of the region.

10. Apparatus according to claim 5 further including a housing supporting said transmitter means and said first and second receiver means, and grip means for holding said housing whereby the housing may be moved manually to alter the extent of the region.

* * * * *

UNITED STATES PATENT OFFICE
CERTIFICATE OF CORRECTION

Patent No. 3,748,636          Dated July 24, 1973

Inventor(s) JOHN F. CORBANI

It is certified that error appears in the above-identified patent and that said Letters Patent are hereby corrected as shown below:

| | |
|---|---|
| Col. 1, line 32 | "least two receivers" should read --at least two receivers-- |
| Col. 2, line 45 | cancel "a" |
| Col. 3, line 11 | "circular function." should read --circular function".-- |

Signed and Sealed this

Eleventh Day of January 1977

[SEAL]

Attest:

RUTH C. MASON
*Attesting Officer*

C. MARSHALL DANN
*Commissioner of Patents and Trademarks*